Jan. 5, 1971   K. MUND ET AL   3,553,092
ELECTRODIALYSIS PROCESS AND CELL
Filed Dec. 1, 1966   2 Sheets-Sheet 2

INVENTORS.
KONRAD MUND
RALF WENDTLAND
AUGUST WINSEL
BY
ATTORNEY.

3,553,092
ELECTRODIALYSIS PROCESS AND CELL
Konrad Mund, Pockelsstrasse 4, Braunschweig, Germany;
Ralf Wendtland, Hornauerweg 14, Fischbach, Taunus,
Germany; and August Winsel, Gundelhardstrasse 58,
Kelkheim, Taunus, Germany
Filed Dec. 1, 1966, Ser. No. 598,507
Claims priority, application Germany, Dec. 4, 1965,
S 100,800
Int. Cl. B01k 1/00; B01d 13/02
U.S. Cl. 204—180                       29 Claims

ABSTRACT OF THE DISCLOSURE

Process and device for electrodialysis. The process involves supplying electrolyte to a cell having two electrodes which have an ion-exchange layer sandwiched between them. Gas can also be passed concurrently through the electrodes.

---

Figure 1:
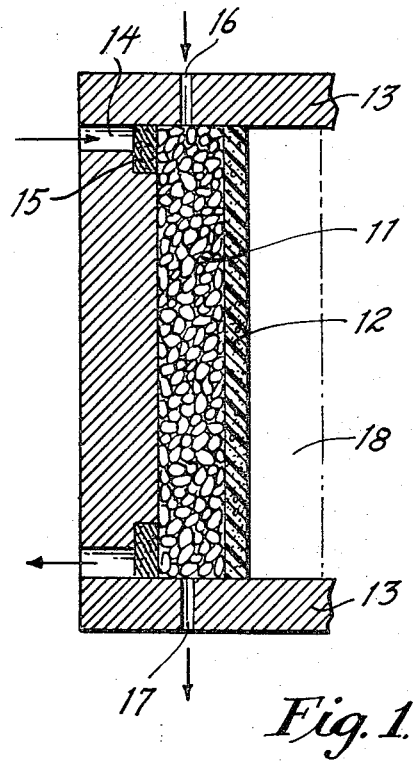

The present invention relates to a process and device for electrodialysis. The device of the invention comprises at least one porous electrode having a layer of ion-exchange material covering the pores of said porous electrode. In accordance with the process of the invention there are obtained electroyltes having an extremely low residual concentration of ionizable content.

It is known as disclosed in U.S. Pat. 2,636,852, which is incorporated herein by reference, to subject solutions of ion materials to electrodialysis. Electrodialysis makes it possible, for instance, to transport in an aqueous solution of a salt, the anions from the solution in the cathode chamber into the anode chamber and to increase its concentration therein. The two electrolyte chambers are separated from each other by a diaphragm or by an ion-exchange membrane. The electrodialysis is initiated as soon as an electrical current of sufficiently high voltage is applied to the cell.

It is also known as is described, for instance, in British Pat. 972,915 which is incorporated also by reference, to minimize the losses of energy which result from the decomposition of water taking place during the electrodialysis of aqueous solutions. For this purpose one may use either two hydrogen electrodes or two oxygen electrodes, of which in each case one is operated as the anode and the other as the cathode. The oxygen or hydrogen, respectively, which is generated during the electrodialysis at the anode or cathode, respectively, is thereby led to the counter-electrode where it is electrochemically redissolved. Thus, the energy used in the evolution of decomposition products is in greater part regenerated or recovered by a subsequent electrochemical reaction or dissolution.

A number of difficult problems occur in the prior art. For instance, it is recognized that osmosis of the water from the diluted electrolyte through the ion-exchange membrane into the concentrated electrolyte counteracts the electrodialysis. This undesirable effect can be reduced by keeping the concentration differential of ions small between the two electrolyte chambers which are separated by the diaphragm or membrane. In practice this is attempted by carrying out the electrodialysis successively in a multiplicity of cells or chambers in a stepwise manner.

A process and a device applying this principle is described, for instance, in the published German patent application DAS 1,213,382, which is also incorporated herein by reference.

It is also known from the prior art that reaction water is formed in a fuel cell or fuel cell battery which is operated with hydrogen or hydrogen-containing and oxygen or oxygen-containing fuel materials. The reaction water dilutes the electrolyte and makes the operation of the cell or battery less efficient. Among others, electrodialysis has been proposed as a means for the removal of the excess reaction water. A process applying this principle has been described, for instance, in British Pat. 1,002,419 which is incorporated herein by reference.

The devices and processes for the electrodialysis of the prior art have in common that at least two open electrolyte chambers which contain electrodes immersed in electrolyte are separated from each other by the ion-exchange membrane. In these devices, a concentration gradient of the ions establishes itself in each of the electrolyte chambers in the electrolyte along a connecting line between the two electrodes and perpendicular to the ion-exchange membrane. There occurs an increased ion concentration (cations or anions) at the respective cation or anion exchange membrane. This increased ion concentration in proximity to the ion-exchange membrane is only insufficiently decreased by diffusion or convection and impedes the electrodialysis. See for instance the process disclosed by U.S. Pat. 2,636,852. Moreover, the concentration polarization in the electrodes results in additional substantial losses of electrical energy in the electrodialysis devices of the prior art. It is therefore apparent that the prior art processes and devices still fall short of the necessary efficiency for economical commercial operations.

It is therefore an object of the persent invention to provide a process and device or electrodialysis, which do not have the above mentioned disadvantages, and which have unexpected advantages thereover. Moreover, the device of the invention is compact, of unitary, functional and mechanically stable construction, these being important attributes for modern applications.

In accordance with the present invention, there is provided an electrodialysis cell in which the openings of the pores on that side of a porous electrode which faces the counter electrode are covered by an ion-exchange material. The pores of at least one electrode which are filled with the solution to be dialyzed form the electrolyte chamber of the electrode. With the exception of the inlet and outlet areas for the electrolyte, and if applicable for the gas all those electrode surfaces which are not covered by the ion-exchange material are provided with a covering which is impermeable to ions, gases and liquids.

Unexpectedly, in accordance with the process and electrodialysis cell of the invention, an electrolyte can be obtained by one passage through the cell which has an exceedingly low residual ionizable content. Thus using, for instance, potassium hydroxide an anolyte is obtained whose ionizable concentration is decreased from 6 equivalent/liter to 0.2 equivalent/liter or even less in one passage through one electrodialysis cell of the invention. The importance of this advantageous result, namely such a low ionizable content in the anolyte is apparent from the fact that the anode (as a result of the flushing effect of the hydroxyl ions flowing to the reaction centers), can still maintain at such low electrolyte concentrations a current density which is above the minimum necessary for concentration changes by means of dialysis. This minimum current density results from the fact that, following the diffusion from the concentrated (6 N) potassium hydroxide which enriches the catholyte, potassium hydroxide reaches the anolyte. This flow must, therefore, be compensated to enable a further depletion of the anolyte.

Figure 2:
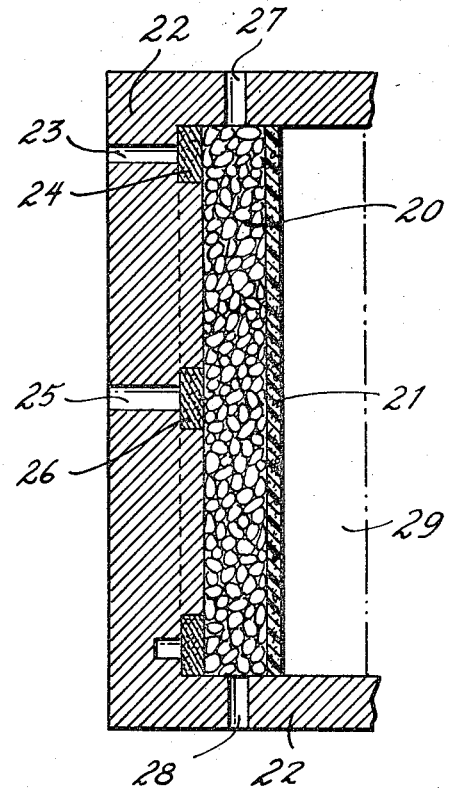
Figure 3:
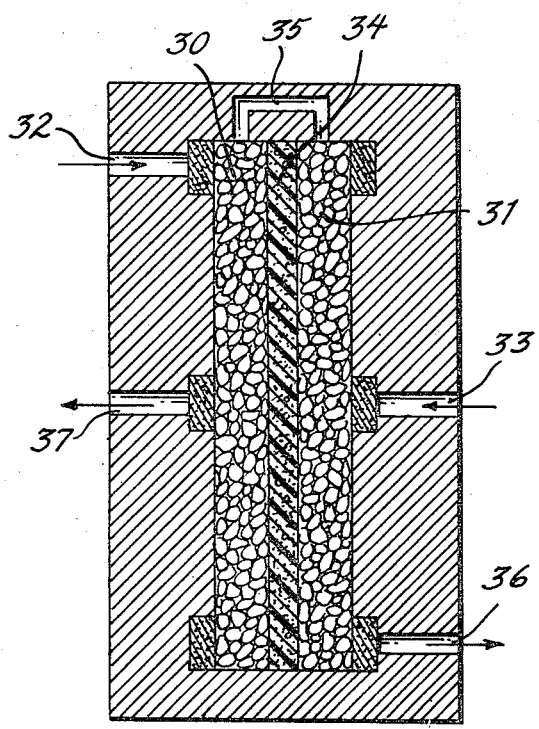
Figure 4:
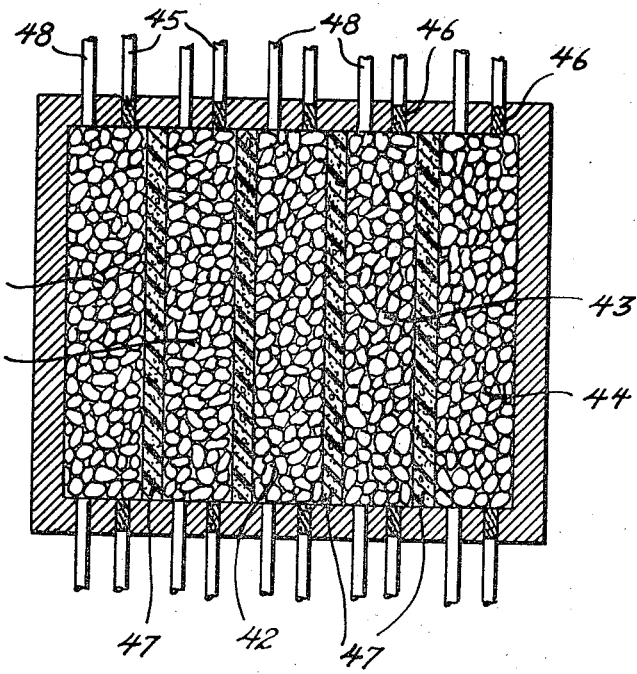
Figure 5:
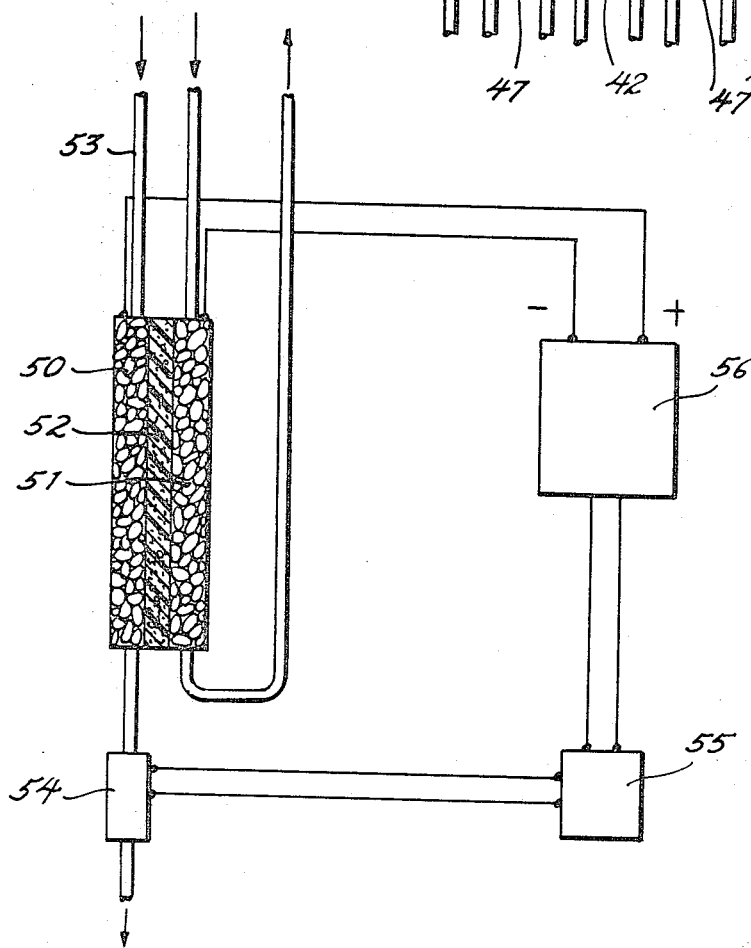

The apparatus which may be used herein is illustrated in the accompanying drawings, in which:

FIGS. 1 and 2 are a diagrammatic cross-section of various electrodes of the invention, FIG. 3 is a diagrammatic cross-section of a cell of the invention, FIG. 4 is a cross-section of a multiplicity of cells of the invention, and FIG. 5 is a diagrammatic cross-section arrangement with pH control.

The areas, the inlet and outlet areas, which are permeable to the electrolyte are covered by porous layers the pores of which are on the average substantially smaller than the pore size prevailing in the interior of the electrode. The solution to be dialyzed is introduced through one of these layers and discharged through the other layer. In the operation, a pressure differential is generated between the solutions contained in these layers which causes the electrolyte to flow through the finely porous inlet and outlet layers (called herein "cover layers") and through the pores of the electrode. Unexpectedly, this arrangement and process effectively prevent the build-up of an excessive ion concentration in the vicinity of the ion-exchange material.

The present invention provides an electrodialysis device which comprises at least one porous electrode in which the openings of that side of the electrode which face the counter-electrode are closed by an ion-exchange material in contact with the said electrode side. When considering a pair of eelctrodes of opposite polarity, the ion-exchange material is sandwiched between the electrodes forming therewith a unitary cell unit. Another characteristic feature of the cell of the invention is that the electrode pores are filled, when in operation, with the electrolyte to be dialyzed. Thus, the dialysis cell of the invention comprises electrolyte-filled porous electrodes of alternating polarity having sandwiched between each pair thereof an ion-exchange material. With the exception of suitable inlet and outlet means for the electrodes for electrolyte, or if desired for gases, the electrodes of the invention are ion, gas and liquid impermeable.

The inlet and outlet means of the electrodes for the electrolyte are preferably finely porous layers in which the capillary pressure of the electrolyte is larger than that in the pores of the electrode. This facilitates containing and flowing the electrolyte within the electrodes. Since the electrodes can have any suitable shape, the flow means are disposed wherever suitable. In rectangular shaped electrodes, the inlet and outlet areas are advantageously arranged at two opposite edge areas of the electrode. In round or circular shaped electrodes, the inlet area is suitably arranged in or towards the center of the electrode, with the electrolyte collecting channel provided at the edge of the electrode.

The process of the present invention, for the carrying out of the electrodialysis comprises causing electrolyte to flow through the porous areas of the electrode between the inlet area and the outlet area thereof.

Advantageously, the anolyte and the catholyte are led counter currently through the pores of the respective electrodes. And, if desired, it is often advantageous to divide the ion solution into two portions and feed each portion separately to the electrodes of opposite polarity. If gases are fed to the electrodes for saving electrical energy, the gases are advantageously introduced and caused to flow in the same direction through the electrode pores as the solution to be dialyzed. Gas can be fed with the anolyte and catholyte.

In a preferred embodiment of the process, the electrical current effecting the dialysis and the rate of flow of the electrolyte solution are controlled by and in connection with the pH-values.

The pores of the so-called cover layers for the inlet and outlet areas for the electrodes have such a cross-section that the capillary pressure in the pores is greater than the gas pressure in the electrode. The pore size is, therefore, related to the operating gas pressure which normally varies between 0.2 and 2 atmosphere gauge, more generally between 0.5 and 1 atmosphere gauge. Accordingly, it is desirable that the average pore diameter range between 3 and 6 microns; desirably, it is not below 1 micron. The size of the pores of the electrodes is, therefore, correspondingly larger.

The gas formed in the dialysis or the gas introduced from the counter-electrode for saving energy can, therefore, not escape through this cover layer. The introduction and the removal of the gas can be effected under a substantially constant pressure through suitable means such as over a third open area of the otherwise closed surface of the electrode. The gas inlet may have, for instance, the form of a pipe connection or sleeve. A fourth outlet opening means is provided in those instances where the feed gas introduced into the electrode contains an inert gas, which must be removed from the electrode.

Although the electrode can have any desired shape or form, it is preferred to design the electrode either as a rectangular plate or as a circular disc. With the circular discs, the electrolyte preferably flows radially. With the rectangular plates the electrolyte preferably flows from one edge of the electrode to the opposite edge.

The rectangular plate and the circular disc type electrodes are exemplified in FIGS. 1 and 2 of the accompanying drawings, wherein the electrolyte flows uniformly through all areas of the electrodes. The optimal form of the electrodes is achieved when the areas of constant rate of flow of the electrolyte coincide with the areas of constant concentration of ions within the electrode. This is attained when the distances between the inlet and outlet areas are the same in all places.

FIGS. 1 and 2, which are not drawn to scale show examples for the arrangement of the inlet and outlet areas in a rectangular and in a cylindrical electrode, respectively. The rectangular electrode 11 is covered on the side which faces the counter-electrode by an ion-exchange membrane 12 and 13 the electrodialysis container. The electrolyte inlet 14 with the cover layer 15 are formed by corresponding spaces in the wall of the container 13 filled with a porous carbon. The gas is circulated through borings 16 and 17. The space of the counter-electrode is designated by 18. It fits similarly to electrode 11.

The electrodialysis device of FIG. 2 comprises a circular electrode 20 with an ion-exchange membrane 21 and leakproof electrode enclosure 22. The electrolyte is introduced through inlet 23 of the periphery, which is covered by by cover layer 24. The electrolyte is removed over central outlet area 25 which is covered by cover layer 26. The gas is introduced over boring 27 in enclosure 22 and removed at outlet 28. The counter electrode (not shown) is positioned at 29.

The cover layers may be made of any suitable porous material, electrically conductive or not, for instance, of a porous sintered metal or of a finely porous non-conductor, such as asbestos or carbon. They may extend over the whole surface of the electrode under enclosures 13 and 22; only the gas inlets and outlets penetrate through the cover layer.

If the porous electrode has the form of a cylinder, the electrodialysis device of the present invention may be constructed differently. The bases or end faces of the cylinder are then provided with finely porous cover layers and the outer cylinder surface is covered by an ion-exchange membrane. The electrolyte flows through the pores of the cylinder in the direction of the axis of the cylinder. The gas may be introduced, and removed, respectively, over gas lines which penetrate through the said cover layers.

Generally, only those parts of the ion-exchange membrane which cover the pore openings at the surface of the electrodes contribute significantly to the electrodialysis. It is therefore sufficient to merely close or cover those pores which project to the surface area of the electrode with ion-exchange material. Since most ion-exchange materials have thermoplastic properties, they can therefore be pressed into the pores of the electrode at moderate temperatures. The interposition of a diaphragm of an insulator assures that the anode and cathode are not short circuited. A suitable embodiment of the invention is therefore a porous electrode, the openings of which are covered by a porous ion-exchange material, the space of the remaining non-porous surface of the electrode which faces the counter electrode being insulated from the counter electrode by a suitable insulator, such as a fibrous non-conductive material.

It is also advantageous if desired to design both electrodes of each electrodialysis cell as gas diffusion electrodes. In this case, the ion-exchange membrane is provided, for instance, between a hydrogen anode and an oxygen cathode, and the corresponding gases are led to the electrodes. The oxyhydrogen gas cell formed in this manner is capable of generating and providing the electrical energy which is required for the electrodialysis by the electrochemical reaction of the two gases fed to the electrodes. Since the feed gases often contain inert components, it is particularly desirable in this case that the gases are made to flow through the electrodes insofar as is possible in accordance with the above-mentioned optimum flow pattern. This can be achieved by a corresponding design of the electrodes and especially by the corresponding relative arrangement of the inlet areas and outlet areas for the gases in the electrodes. It is therefore advantageous to pass the gas through the electrode pores concurrently with the electrolyte.

When a hydrogen anode is combined with a hydrogen cathode in a dialysis cell, the cathodically developed hydrogen is so pure that it is not necessary to flush the anode. The same is true with the development of oxygen in a dialysis cell which comprises an oxygen anode and an oxygen cathode. With this arrangement, the total energy required for the electrodialysis is reduced by that amount which corresponds to that otherwise consumed for the decomposition of the water.

The plate-like or circular electrodes may also be provided on both faces with an ion-exchange material with the counter electrodes provided on both sides. In this manner there is obtained in accordance with the invention with an electrodialysis cell with alternatingly arranged anodes and cathodes and interposed ion-exchange membranes, whereby the anolyte and catholyte, respectively, may be flown through the pores of the individual anodes and cathodes in parallel or in series.

Such an arrangement is illustrated by FIG. 4 wherein 40, 42 and 44 are the cathodes and 41 and 43 are the anodes the electrodes being connected in parallel. The cathodes are separated from the anodes by cation exchange material 47. The alkaline electrolyte is fed through conducts 45 through cover layers 46 into the electrodes and is ion-enriched in the cathodes. The gases are fed through inlets 48.

When an acid electrolyte is used, the electrolyte is ion-enriched in the anodes, and the cathodes are isolated from the anodes by an anion-exchange resin material 47. The differential in voltage is amplified at 46 which then controls the flow of electrolyte until it reaches the desired pH value in 44.

In the practice of the invention any ion-exchange material may be used, the selection of the particular optimum ion-exchange resin being dependent on the pH of the electrolyte. Suitable resins are disclosed in U.S. Pat. 2,636,852 and in Ion Exchange Resins, Kunin, John Wiley & Sons (1958), especially chapters 3, 4, 6 and 7 which are incorporated herein by reference.

Likewise suitable electrode materials are known in the art, such as in that described above. Again pH of the electrolyte influences the optimum selection of electrode material.

In the practice of the electrodialysis in accordance with the process of the present invention, the electrolyte is flown through the pores of the electrodes between the inlet area and the outlet area. With the particular flow pattern achieved in this manner and with the resulting current of electrolyte along the ion-exchange material, there is promoted the passage through the ion-exchange material of even those ions which are initially not, at the beginning of their flow path, in the immediate vicinity of the ion-exchange material. The continuous flushing of the pores of the electrode results also in the significant suppression of the concentration polarization which otherwise occurs in the electrochemical reaction of the gases.

In the process of the invention the concentration of the electrolyte changes along its path through the pore areas of the electrode. Accordingly, there takes place a selective migration and segregation of anions to and/or through the anion exchange material and of cations to and/or through the cation exchange material while the water between the exchange materials acquires a correspondingly more purified condition with respect to its ionizable content. If a cation exchange material is used, the cation concentration in the catholyte ion concentration is larger at the electrolyte outlet than it is at the elecrolyte inlet. In the anolyte, the cation concentration is larger at the electrolyte inlet than it is at the electrolyte outlet. When anion-exchange materials are used, the correspondly converse relationships apply. The process of the present invention makes it therefore possible to maintain the concentration differentials of ions, and accordingly also the occurrence of osmotic reactions at both sides of the ion-exchange membrane small by leading the anolyte and catholyte counter currently through the electrodialysis cell. The process may be carried out continuously or batch-wise.

The electrodialysis cell of the present invention is well suited for the removal of the reaction water formed in oxyhydrogen fuel cells. In these cells (as is described in U.K. Pat. 1,002,419) the electrolyte consists, for instance, of an aqueous potassium hydroxide solution having a concentration of about 6 equivalent/liter, which is gradually diluted by the reaction water formed in the operation of the cell. For the electrochemical concentration of the electrolyte in a cell of the present invention a cation exchanger is used between the electrodes, e.g. between a hydrogen anode and a hydrogen cathode, and the diluted electrolyte solution is flowed through the pores of the anode. Along its path through this electrode the K+ ions are brought by the electrical field into the electrolyte solution of the oxyhydrogen gas cell, which is used as the catholyte. The reaction water having a low potassium hydroxide content leaves the anode and in this manner the potassium hydroxide can be substantially retained in the cell.

If the amount of the reaction water is so large, that it dilutes the electrolyte of the fuel cell to a high degree, for instance, to a concentration of 1 equivalent/liter, it is possible to pass the larger portion of the dilute electrolyte solution through the anode, and the smaller portion at a correspondingly smaller flow rate, counter currently through the cathode with the assistance of a forwarding pump having two cylinders of a different capacity or piston displacement. This results in a great increase in the concentration of the liquid in the cathode, while the reaction water is again removed at the anode.

The dialysis may also be carried out in a device of the present invention comprising a multiplicity of dialysis cells through which the anode and cathode solutions are successively flowed. The operating conditions of each individual cell may thereby be held at the optimum values and controlled to give the maximum performance.

The schematic representation shown in FIG. 3 illustrates a dialysis cell which may be used for this kind of operation in which the anolyte and catholyte are led counter currently to each other into and through anode 30 and 31, the catholyte through 33 and 36, and the anolyte through 32 and 37, respectively. The ion-exchange membrane 34 is positioned between the two electrodes. The working layers of the electrodes are connected by gas filled line 35. The catholyte is pressed through inlet opening 33 into the cathode, passes along the ion-exchange membrane 34 and leaves the cell through outlet 36. The catholyte flows from the center of the cathode to its edge. The anolyte flowing in the opposite direction enters through opening 32 and leaves the anode through the concentric outlet area 37. Of course, the direction of flow of the catholyte and of the anolyte may also be reversed.

It is thereby of advantage to control the input of electrical current for the dialysis and the amount of the dialysis liquid flowing through the electrodes by the pH values of the electrolyte solutions subjected in each instance to the dialysis. This arrangement is shown in FIG. 5, wherein 50 and 51 are the porous anode and cathode, respectively and 52 the ion-exchange resin, here a cation exchange resin (a styrene-divinylbenzene resin with strongly acidic sulfonic acid groups). The electrolyte solution, for instance, from a fuel cell is conducted over pipe means 53 through anode 50 where it is further ion-depleted and fed to pH- sensitive measuring-control device 54. The ion-concentrated electrolyte from the cathode 51 is again fed to the fuel cell. The measuring cell 54 delivers a pH dependent voltage which is compared with a nominal voltage in 55.

The differential in voltage is transmitted to amplifier 56, which regulates the electrolyte feed again until the desired pH is attained in 54.

The follong examples are not to be construed as limitations on this invention.

EXAMPLE 1

An electrodialysis cell in accordance with the present invention was constructed for the removal of the reaction water from alkaline electrolyte of an oxyhydrogen gas cell. The electrodialysis cell contained two circular double skeleton catalyst electrodes having a diameter of 4 cm., which were inserted in suitable holding enclosures. The double skeleton catalyst electrodes were produced by the hot pressing method for a powder mixture, which contained 1.6 parts carbonyl nickel powder of a particle size smaller than $6\mu$ as the skeleton material, and as the starting material for the Raney-nickel catalyst 1.0 part of a powder of a Raney-nickel alloy having a particle size ranging from $30\mu$ to $50\mu$ and containing nickel and aluminum in a 1 to 1 ratio. The electrodialysis cell contained furthermore a cation exchange membrane consisting of sulfonated styrene-divinylbenzene copolymer.

Both electrodes were identical and were built into an enclosure in a manner as shown in FIG. 2 of the accompanying drawings. The closing or cover layers 24 and 26, respectively, were made from asbestos discs, which were 0.3 mm. thick. The cation exchange membrane was inserted between the enclosures 22 and the two enclosures were thereafter joined and pressed together by the use of bracing screws.

Through the electrolyte inlet openings 23 of both enclosures, 6 N potassium hydroxide solution was thereafter fed under a pressure of 0.2 atmosphere gauge, through the cover layers 27 and into the pores of the electrodes. The potassium hydroxide feed solution for each electrode was taken from a separate storage vessel. At this pressure, 3.3 ml. of electrolyte per hour were flowing through the pores of each electrode.

While the electrolyte was continuously flowing, a dialysis current of $i=0.4$ a. was then switched on. The dialysis cell was operated galvanostatically, and the voltage of the cell was adjusted so that a constant current was flowing through the cell. During the start-up period, the voltage at the dialysis cell increased from 0.5 v. to 0.9 v. During the continued operation of the cell, the concentration of the anolyte emanating at the outlet of the anode was gradually decreasing and achieved after 2½ hours a constant value of 0.2 equivalent/liter. The cell produced per hour 1.3 ml. of the anolyte of this low concentration, the remaining amount of water was transferred as water of hydration with the $K^+$-ions through the cation exchanger membrane into the electrolyte space of the counter electrode.

EXAMPLE 2

An electrodialysis cell is set up in which the cathode is made from carbonyl nickel powder (particles less than $7\mu$) Raney-nickel (particle size 40 to $60\mu$) and potassium chloride (70 to $100\mu$) as pore former. An electrode of a diameter of 40 mm. and a thickness of 3 mm. is produced by hot-pressing at 400° C. under a pressure of 0.5 T./cm.² To one of the electrode faces there is then affixed a cation exchange membrane of sulfonated styrene-divinylbenzene copolymer (strongly acidic) and a porous 1 mm. thick nickel plate (50% porosity per volume) as cover plate for the ion-exchange membrane. The electrode plate and the membrane are built into the holder as shown in FIG. 2. The inlet and outlet areas were covered with 0.3 mm. thick metal porous plates.

The holder with the electrode is then immersed into a 0.1 N sodium chloride solution in which there is a platinum anode. Through the electrodes there is passed a current of 1 a. The 0.1 N sodium hydroxide solution is fed into the cathode through the inlet layer and is then enriched through electrodialysis to a concentration of 4.5 N, measured at the outlet. During the operation 3 ml. per hour of catholyte was obtained while hydrogen was taken off under a pressure of 0.2 atmosphere gauge.

The electrolyte potential fell within the initial starting period from 2.5 v. to 2.2 v. as a result of the improvement of the electrochemical properties of the flushed hydrogen cathode.

EXAMPLE 3

An electrodialysis cell similar to that of Example 2 is set up with a porous carbon electrode used as anode for the enrichment of a hydrogen chloride solution. The electrode is made from carbon powder with polyethylene as binder and potassium as pore former used in a weight ratio of 1:3:0.2. The electrode is produced by hot-pressing at 200° C. under a pressure of 0.3 t./c.²

The anion exchange membrane is made of styrene-divinylbenzene copolymer having weakly basic amino groups.

The cathode is a porous nickel electrode. The electrolyte is a 1 N potassium chloride solution. Through the anode there is fed a 0.1 N hydrochloric acid solution. Through electrodialysis the concentration of the solution is raised to 4 N, the outlet flow measures 2 ml. per hour. The electrolysis potential sank as a result of the improvement of the anode from 2.4 v. to 2.0 v. under an electric current density of 1 a. The resulting chlorine was removed from the anode under a pressure of 0.2 atmosphere gauge.

EXAMPLE 4

An electrodialysis cell for removing water from a fuel cell system with an alkaline electrolyte using two oxygen electrodes is illustrated as follows:

The cell is constructed similarly to that shown in FIG. 3. The oxygen cathode is made from a double skeleton electrode where Raney-silver is used as a catalyst. See Fuel Cells, vol. 2, Editor Young Reinhold Publishing Corp. 1963, for further description of the electrode.

The electrode is constructed from a mixture of Raney-silver (65 weight percent silver, particle size $35\mu$) with carbonyl nickel powder (less than $7\mu$) and potassium chloride (less than $100\mu$) as pore former, in a weight ratio of 1:1.5:0.5, at a temperature of 350° C. with 0.5 t./c.²

The oxygen anode is made from a mixture of Raney-nickel (particle size 40 to $50\mu$) with carbonyl nickel (particle size less than $7\mu$) and potassium chloride (70 to $100\mu$) in a weight ratio of 1:1.5:0.3 by hot-pressing at 400° C. under a pressure of 0.5 t./c.² Both electrodes had a diameter of 40 mm. and were 3 mm. thick. Both electrodes were strongly pressed together with, between them, a strongly acidic cation exchange membrane (styrene divinylbenzene with sulfonic acid groups), in a holder.

There is then fed to each electrodes counter currently a 3 N depleted potassium hydroxide electrolyte through inlet means of cover layers of asbestos (0.3 mm. thick) in a fuel cell. In this manner the electrolyte in the anode is further depleted to 0.1 N and in the cathode enriched to 6 N.

The electrolyte was dialyzed under a constant electric current of 1 a. As a result the voltage was raised from 1.2 v. to 1.6 v. because of the ion depletion of the electrolyte in the anode. The oxygen produced is separated or brought in solution from each electrode under a pressure of 1 atmosphere gauge.

EXAMPLE 5

The electrodialysis cell for the removal of water of reaction from an acid electrolyte in a fuel cell is accomplished in the following manner.

The cell is constructed similarly as shown in FIG. 3 using a noble metal hydrogen anode and cathode. The electrodes were prepared from a mixture of palladium zinc alloy (30% by weight palladium, particle size 20 to 35$\mu$) with silver powder (less than 10$\mu$) and potassium chloride (70 to 100$\mu$ in a weight ratio of 1.5:1:0.3). The electrode was formed by hot-pressing under a pressure of 0.5 t./c.$^2$ at a temperature of 350° C. The electrode had a diameter of 40 mm. and a thickness of 3 mm. Subsequently, the zinc is dissolved out with 6 N potassium hydroxide.

Between the two electrodes there is placed an anion exchange membrane (having strongly basic amino groups) and the two electrodes pressed thereon in a holder using two asbestos cover layers.

To each electrode there is fed a 1 N sulfuric acid counter currently which is depleted in the cathode to 0.1 N sulfuric concentration, and in the anode to a concentration of 2 N. The cell was galvanically operated under 0.5 a. current density whereby the potential increased from 0.6 to 0.1 v. The hydrogen pressure in both electrodes was 1 atmosphere gauge.

We claim:

1. A process for electrodialysis of aqueous solutions in an electrodialysis cell or a battery of cells wherein each cell comprises at least one porous electrode, a counter-electrode therefor, and sandwiched between each pair of electrodes, an ion-exchange material covering the sides of the electrodes which face each other, the pores of the first electrode providing the space for a first electrolyte whose ion concentration is to be decreased, the pores of the counter-electrode providing the spaces for a second electrolyte whose ion concentration is to be increased, the process which comprises the steps of supplying the first electrolyte to one of the electrodes, while supplying the second electrolyte to the second electrode, contacting at least one of the electrolytes while it is in the electrolyte space of the electrode with the ion-exchange material, electrodialysing the electrolyte, thereby increasing the ion concentration of the first electrolyte, decreasing the ion concentration of the second electrolyte, while direct electric current is being supplied to the electrodes, and withdrawing the ion-enriched and ion-decreased solutions from the respective electrodes.

2. The process of claim 1 in which the steps of supplying and withdrawing solutions are carried out continuously.

3. The process of claim 1, in which the first and second solution are forced through the pores of their respective electrodes in opposite directions.

4. In the electrodialysis of an alkaline solution by the process of claim 1 the improvement of supplying gaseous hydrogen to the electrode at which oxygen is evolved.

5. In the electrodialysis of an acidic solution by the process of claim 1 the improvement of supplying gaseous oxygen to the electrode at which hydrogen is evolved.

6. In the process of claim 1 the step of supplying gas evolved at one electrode to the electrode of opposite polarity.

7. The process of claim 1 wherein the electrolyte is an alkaline solution.

8. The process of claim 1 wherein the electrolyte is an acidic solution.

9. The process of claim 1 wherein the anolyte and catholyte are flowed countercurrently through the pores of the respective electrodes.

10. The process of claim 1 which comprises further the step of flowing a gas through at least one of the electrodes.

11. The process of claim 10 wherein the gas is flowed in the same direction through the electrode pores as the solution to be electrodialized and concurrently therewith.

12. The process of claim 10 wherein hydrogen is supplied to one of the electrodes and oxygen is supplied to the counter-electrode.

13. The process of claim 10 wherein at least one of the two following gases: hydrogen or oxygen is fed to one of the electrodes.

14. The process of claim 1 wherein there is evolved at least one of the two following gases: hydrogen and oxygen.

15. The process of claim 1 wherein the solution is potassium hydroxide.

16. The process of claim 1 wherein at least one of the electrolyte solutions is supplied directly into the electrode.

17. The process of claim 10 wherein the gas is supplied directly into the electrode.

18. The process of claim 1 wherein the cell is free of separate electrolyte compartments.

19. The process of claim 10 wherein the cell is free of separate gas compartments.

20. The process of claim 1 wherein the electrolyte flows only through the pores or the electrodes.

21. The process of claim 1 wherein the gas flows only through the pores of the electrodes.

22. The process of claim 1 wherein the gas which is evolved from the electrodialysis of the aqueous solution at one electrode is supplied to the counter-electrode.

23. The process of claim 22 wherein the gas which is supplied at the counter-electrode is removed thereat.

24. The process of claim 23 wherein the gas which is removed at the counter-electrode is one of the following gases: oxygen, hydrogen or chlorine.

25. The process of claim 1 wherein the cell comprises two porous electrodes.

26. The process of claim 1 wherein the cell comprises one porous electrode supplied with electrolyte which is electrodialized.

27. A process for electrodialysis of aqueous solutions in an electrodialysis cell or a battery of cells wherein each cell comprises a porous gas diffusion fuel electrode, a porous gas diffusion oxygen electrode, and sandwiched between said pair of electrodes an ion-exchange material covering the sides of the electrodes which face each other, the pores of the first electrode providing the space for a first electrolyte whose ion concentration is to be decreased, the pores of the second electrode providing the spaces for a second electrolyte whose ion concentration is to be increased, the process which comprises the steps of supplying the first electrolyte to one of the electrodes, while supplying the second electrolyte to the second electrode, contacting at least one of the electrolytes while it is in the electrolyte space of the electrode with the ion-exchange material, electrodialysing the electrolyte, thereby increasing the ion concentration of the first electrolyte and decreasing the ion concentration of the second electrolyte, withdrawing the ion enriched and ion-decreased solutions from the respective electrodes, generating oxygen and hydrogen during the electrtodialysis, feeding the oxygen to the oxygen electrode and the hydrogen to the fuel electrode, and generating electrical energy.

28. The process of claim 27 wherein the electrical energy which is generating is supplied to the electrodes to provide the energy for the electrodialysis.

29. The process of claim 1 wherein the electrolyte which is supplied to and removed from the electrode passes through a cover layer whose pores have a capillary pressure greater than that of the pores of the electrodes before flowing in or out of said electrodes.

References Cited

UNITED STATES PATENTS

| | | | |
|---|---|---|---|
| 2,763,607 | 9/1956 | Staverman | 204—131 |
| 3,124,520 | 3/1964 | Juda | 204—86 |
| 3,306,832 | 2/1967 | Lenis et al. | 204—101 |
| 3,322,574 | 5/1967 | Justi et al. | 136—86 |
| 3,378,403 | 4/1968 | Waubke et al. | 136—86 |

JOHN H. MACK, Primary Examiner

A. C. PRESCOTT, Assistant Examiner

U.S. Cl. X.R.

204—301